Feb. 11, 1969     F. R. GRANT ET AL     3,426,420
METHOD OF MAKING BRAZED COMPOSITE TUBING FOR HEAT
EXCHANGERS USED IN CORROSIVE FLUIDS
Filed April 8, 1966

3,426,420
METHOD OF MAKING BRAZED COMPOSITE TUBING FOR HEAT EXCHANGERS USED IN CORROSIVE FLUIDS
Foster R. Grant, Millis, and Maurice L. Torti, Jr., Boston, Mass., assignors to National Research Corporation, Newton Highlands, Mass., a corporation of Massachusetts
Filed Apr. 8, 1966, Ser. No. 541,222
U.S. Cl. 29—474.5                    1 Claim
Int. Cl. B23k *31/06, 35/38, 35/28*

ABSTRACT OF THE DISCLOSURE

Bayonet heater tubing is made by enclosing a braze-covered liner of inexpensive high conductivity, high thermal expansion metal with a sheath of refractory metal which has a lower coefficient of expansion and heating the assembly to produce a well bonded laminate tubing.

---

Our invention relates to heat exchange tubing used in corrosive fluid media. Corrosion resistant refractory metals (specifically tantalum, columbium and their common and proprietary alloys; e.g., Ta–10W, T111, T222, SGS, etc.), are used for this purpose because of their high degree of chemical inertness. However, the high cost of tantalum has motivated the art to use composite tubing with an inner tube of a less costly metal such as copper or stainless steel and an outer tube of tantalum. Heat transfer resistance across the interface is reduced (or eliminated) by making a good bond through cladding techniques. Brazing preceded by deformation is known for other materials. But brazing processes have not been adopted for tantalum because of supposed impossibility.

We have discovered an improved technique of vacuum brazing which does away with the need for the preliminary deformation of the tubes, yet provides a composite tantalum tube product with substantially equal heat transfer properties. This allows considerable savings in manufacturing costs since it eleminates the paraphernalia and time associated with deformation (usually done by hydrostatic expansion of the inner tube) and eliminates the necessity for annealing the inner tube in preparation for the deformation step. Most significantly, the invention also provides success in brazing of thin tantalum tubes and opens the way to the economical production of large diameter heat transfer tubes having high resistance to corrosion, consistent with good heat transfer properties.

An improved process for making copper-tantalum composite tubing for heat exchange use in corrosive fluids (e.g., bayonet heaters) and the resultant improved product are presented. An inner copper tube is covered with braze foil and the outer tantalum tube is slipped over the foil covered inner tube. The braze foil is selected from the brazing materials having a substantial temperature differential between melting (solidus) and flow (liquidus) points. The gap between the tubes is carefully selected. The assembly is heat treated in vacuum for a limited time. The heating temperature is held below the flow point. The resultant composite tubing demonstrates excellent bonding—from 95–100% of the interfacial circumferential area and good heat transfer and strength characteristics.

Objects

The principal object of the invention is the production of corrosion-resistant composite tubing with good heat transfer characteristics.

A further object of the invention is to achieve such a product without the usual preliminary deformation step.

A still further object is to provide a method of making such tubing which can start with an unannealed liner tube.

Figure 1:
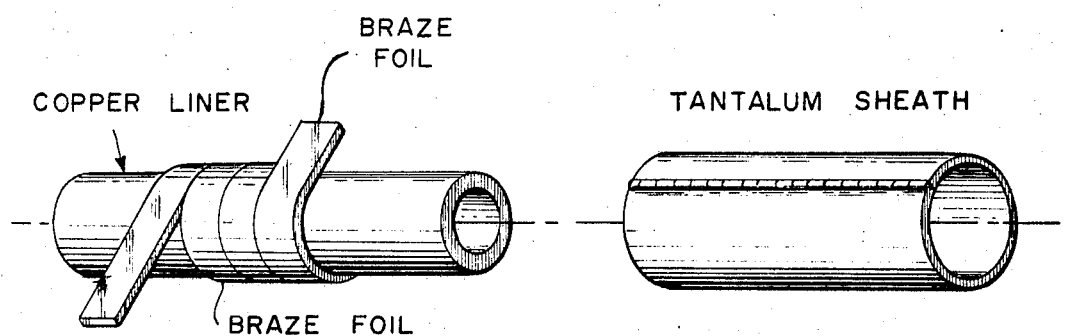
Figure 2:
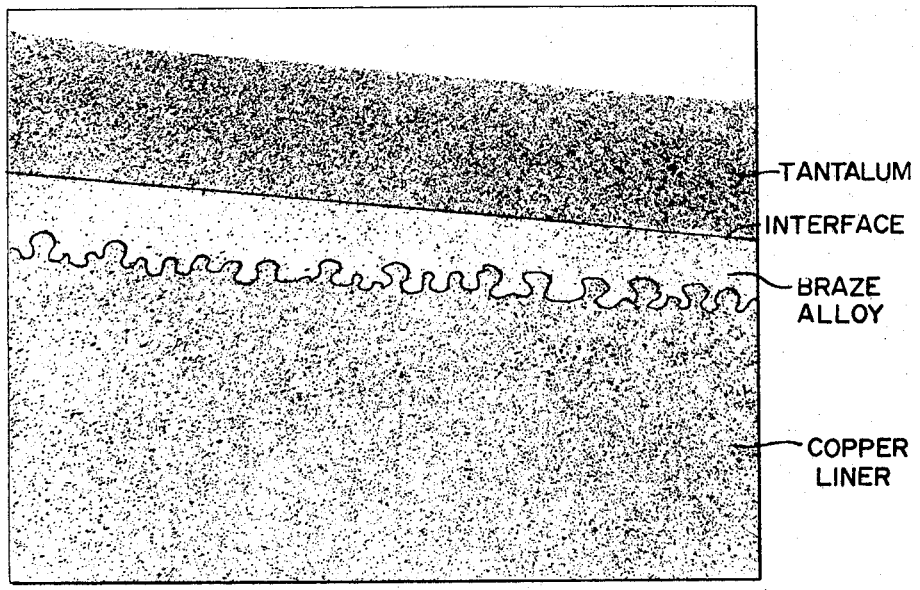

Other objects, features, and advantages will be apparent from the following detailed description, taken in conjunction with the accompanying drawings, wherein:

FIG. 1 is a view of the elements of the composite tube before assembly and FIG. 2 is a copy of a photomicrograph showing the bond between sheath and liner tubes obtained after heat treatment.

Referring to FIG. 1, the heater tube comprises a copper liner wrapped with a spiral of brazing foil, adjacent turns of the spiral butting without overlap. One slides a tantalum sheath over the brazing foil enclosed liner. Typical dimensions are as follows:

Copper liner—1 to 6 inches I.D., .065 to .240 inch thick.
Foil—.003 to .005 inch thick for tantalum sheath, welded tubing, I.D., sized to provide a .004 to .030 inch gap between liner and sheath.
Thickness—.010 inch.

The alloy, of choice, is 50 Ag–15.5 Cu–15.5 Zn–16 Cd–3 Ni, a commercial alloy, marketed, for instance, by Handy and Harmon Co. under the trademark Easy-Flo 3. This assembly is placed in a vacuum furnace and, typically, heated to about 1230° F. for 10 minutes. The assembly is then furnace cooled.

During the heat treatment, the brazing alloy melts at 1170° F., but never reaches its 1270° F. flow point. The copper which has a coefficient of expansion almost three times that of the tantalum expands across the small gap between the liner and sheath to press the molten brazing alloy and promote the reactions between the alloy and the liner and sheath. The brazing alloy readily wets tantalum in vacuum at the heat treating temperautre and a good bond is formed around the entire periphery of the liner. We have routinely obtained 95–100% bonding with this treatment. In complete bonding, when it occurs, is generally limited to the region of the weld in the tantalum liner tube.

The time of heating can be as long as one hour above melting point for short lengths of tubing (e.g., one to two inches), but for the longer lengths used for commercial bayonet heaters, the time of heating must be limited to about 10 minutes at the heat treatment temperature and in any event between 5 and 30 minutes.

When using the Easy-Flo 3 brazing alloy, good bonding (90% of periphery or better) can be achieved at temperatures of 1200–1250° F. (compared to the 1170 and 1270° F. melting and flow points). When using another alloy; i.e., Easy Flo, good bonding is achieved at a heat treatment temperature of 1168° F. (compared to 1160 and 1175° F. melting and flow points for the alloy). The general condition is that the heat treatment temperature should be within 1/5 to 4/5 the gap between the melting and flow points of the brazing alloy. The brazing alloy must be selected to wet tantalum in vacuum within this desired temperature range and the copper and tantalum must be sized to allow an annular gap, after the foil is inserted, of no greater than 0.5% of the outer diameter of the inner tube. The lower limit is the gap necessary for sliding the sheath over the braze covered liner. The more general condition is that the annular gap must be less than the difference in expansion between the liner and sheath when heated to the brazing temperature. The foil should have an even cross section such as that provided by butting spiral turns at the side edges of the ribbon-like brazing foil.

Example 1

Several solders were coated onto the outside diameters of copper tubing samples. The tubing was 1½ inch O.D. The solders were Easy-Flo, Easy-Flo 3, Unibraze 350 and low fuming bronze. A tantalum sheath was slid over each copper sample tube length, the sheath being 2 in. long, 1.508 in. O.D. and .010 in. wall thickness. Then the copper liner was hydraulically expanded to fit snugly against the sheath. The pieces were heated in argon atmosphere for 15 minutes at the temperatures:

| | °F. |
|---|---|
| Easy-Flo | 1225–1600 |
| Easy-Flo 3, Unibraze 350 | 1320–1600 |
| Bronze | 1650–1750 |

All these runs were unsuccessful; the braze did not wet the tantalum and the copper liner was able to shrink away upon cooling.

A second experiment was run, this time according to the present invention, wherein Easy-Flo 3 braze foil, .003 in. thick by 2 in. wide was wrapped around the copper. The tantalum sheath was slid over this and the composite was heated in vacuum to 1220° F. and held at this temperature for one hour. The solder wet the tantalum and copper very well and a bond was produced over 90–95% of the circumferential interface, a portion of the bond being shown in the FIG. 2 (66 times magnification) photomicrograph. In the figure, the lower light area is copper.

A third experiment was run in which the assembled composite was heated to 1320° F. in vacuum and held at temperature for 10 minutes. A relatively poor bond (80% of circumference) was obtained.

A fourth run, heating at 1270° F. for 1 hour also resulted in a poor bond (50%).

A fifth run, heating at 1180° F. for one hour, resulted in a relatively poor bond (80%).

Example 2

The invention was applied with Easy-Flo solder (composition 50 Ag, 15.5 Cu, 16.5 Zn, 18 Cd; the melting point of Easy-Flo is 1160° F. and the flow point is 1175° F.), the dimensions of the assembly being the same as in Example 1 (i.e., second experiment of Example 1). The composite was heated in vacuum to 1168° F. and held at temperature for 1 hour. This produced a 90–95% bond.

Heating to 1180° F. produced a poor bond (50–60%).

Example 3

A six-inch copper tube (6.607" O.D. .240 wall) was spirally wrapped with Easy-Flo 3 braze oil (.005" thick, 2" wide) with adjacent spiral turns butting. A .010 inch thick tantalum sheath (6.650 I.D.) was slid over the braze wrapped liner, thus providing a gap of about .033 inch between the outer diameter of the braze wrapped liner and sheath inner surface. The assembly was vacuum heat treated at 1230° F. for 10 minutes to produce an excellent bond. The outer diameter of the tantalum sheath before brazing was 6.670 inches. The outer diameter of the tantalum sheath after brazing was 6.625 inches (except for a high spot of 6.637 inches at the weld). This demonstrates the strength of the bond formed during the brazing step in that the relatively hard tantalum was contracted with the copper liner upon cooling without pulling away.

The above examples and the foregoing description of the preferred embodiment are not to be construed as limiting, except as specifically stated, since it will now be apparent that variations of our invention can be made within the scope of our teaching which are equivalent to the said embodiment. The scope of protection sought, commensurate with our contribution to the art, is set forth solely in the following claim.

What is claimed is:

1. The method of making a heat transfer tube for corrosive environments and the like comprising the steps of:
    (a) providing a copper cylindrical liner tube and enclosing said liner in an annular layer of a brazing material having a flow point several degrees above its melting point and having a melting point in excess of about 1000° F.;
    (b) enclosing the braze covered liner tube in a thin wall sheath of a corrosion resistant refractory metal selected from the group consisting of tantalum, columbium and their alloys, the gap between the braze covered liner tube and the interior surface of the sheath being less than the difference in expansion between the liner and sheath at the brazing temperature and no greater than .5% of the outer diameter of the braze covering;
    (c) heating the sheath-liner assembly to a temperature above the melting point and below the flow point of the brazing material, under a vacuum environment; the assembly being held above a temperature of M.P. plus ⅕ (F.P.—M.P.) and below a temperature of M.P. plus ⅘ (F.P.—M.P.) for a period between 5' and 30 minutes during the heating, where M.P. is the melting point and F.P. is the flow point of the brazing material.

References Cited

UNITED STATES PATENTS

| | | | |
|---|---|---|---|
| 1,078,906 | 11/1913 | Eldred | 29—473.5 |
| 1,193,667 | 8/1916 | Corey | 29—474.4 |
| 2,231,027 | 2/1941 | Renner. | |
| 2,713,196 | 7/1955 | Brown | 29—497.5 X |
| 2,882,587 | 4/1959 | McCowan. | |
| 2,947,078 | 8/1960 | Pflumm | 29—498 X |
| 2,975,259 | 3/1961 | Osborn. | |
| 3,025,596 | 3/1962 | Ward | 29—474.5 X |
| 3,101,531 | 8/1963 | Roseberry | 29—474.4 |
| 3,120,702 | 2/1964 | Smith | 29—527 |
| 3,156,042 | 11/1964 | Reed | 29—501 X |
| 3,188,724 | 6/1965 | Bates. | |
| 3,264,524 | 8/1966 | Dahlgren | 317—101 |
| 3,293,741 | 12/1966 | Gilliland | 29—501 X |
| 3,317,288 | 5/1967 | Marshall | 29—501 X |

FOREIGN PATENTS

| | | |
|---|---|---|
| 609,035 | 9/1948 | Great Britain. |
| 1,065,100 | 9/1959 | Germany. |

JOHN F. CAMPBELL, *Primary Examiner.*

R. F. DROPKIN, *Assistant Examiner.*

U.S. Cl. X.R.

29—473.5, 474.1, 494, 497.5, 498, 501, 504, 198, 199